(12) United States Patent
Fireaizen

(10) Patent No.: US 9,134,412 B2
(45) Date of Patent: Sep. 15, 2015

(54) TRANSPONDER DEVICE

(71) Applicant: Elta Systems Ltd., Ashdod (IL)

(72) Inventor: Moshe Fireaizen, Halamish (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 14/417,185

(22) PCT Filed: Jul. 22, 2013

(86) PCT No.: PCT/IL2013/050619
§ 371 (c)(1),
(2) Date: Jan. 26, 2015

(87) PCT Pub. No.: WO2014/020592
PCT Pub. Date: Feb. 6, 2014

(65) Prior Publication Data
US 2015/0168549 A1 Jun. 18, 2015

(30) Foreign Application Priority Data
Jul. 29, 2012 (IL) .......................................... 221162

(51) Int. Cl.
*H04B 3/36* (2006.01)
*G01S 13/75* (2006.01)
*H04B 7/06* (2006.01)
*H04B 7/15* (2006.01)

(52) U.S. Cl.
CPC ................ *G01S 13/75* (2013.01); *G01S 13/758* (2013.01); *H04B 7/06* (2013.01); *H04B 7/15* (2013.01)

(58) Field of Classification Search
CPC ... H04W 24/00; H04W 84/047; H04W 84/08; G01S 1/70; G01S 13/767; G01S 13/74; G01S 15/876; G01S 13/751; G01S 2013/9339; G01S 13/76; G01S 7/412; H04L 2025/03426; H04B 7/15542; H04B 2203/5479

USPC ......... 370/315, 279, 316, 282, 334; 455/13.1, 455/101, 16, 103, 114.2, 73; 375/211, 219; 342/30
See application file for complete search history.

(56) References Cited

U.S. PATENT DOCUMENTS

| 2,908,002 A | 10/1959 | Van Atta |
| 3,736,592 A | 5/1973 | Coleman |
| 4,806,938 A * | 2/1989 | Meadows ...................... 342/370 |

(Continued)

FOREIGN PATENT DOCUMENTS

WO WO 2011/113530 9/2011

OTHER PUBLICATIONS

International Search Report mailed Nov. 10, 2013.

*Primary Examiner* — Rahel Guarino
(74) *Attorney, Agent, or Firm* — Frommer Lawrence & Haug LLP; William S. Frommer

(57) ABSTRACT

A transponder system including first and second arrays of receiving and transmitting antenna elements arranged in spaced apart relationship with a predetermined spacing. The antenna elements of the first array are connected, via respective transmission modules, to respective antenna elements of the second array in accordance with their positions in the arrays thus forming receiving and transmitting pairs of antenna elements. The transmission modules include: a sampler adapted for digitizing signals received by the receiving antenna element of the corresponding pair, a memory for storing a digital representation of the received signals, and a signal generation module operable for generating from the digital representation a signal to be transmitted by the transmitting antenna element of the corresponding pair with a predetermined temporal delay to thereby provide a predetermined angular shift between a waveform of the received input signal and a waveform of the collective output signal.

19 Claims, 5 Drawing Sheets

(56) References Cited

U.S. PATENT DOCUMENTS

| | | |
|---|---|---|
| 5,387,916 A | 2/1995 | Cohn |
| 8,022,874 B2 | 9/2011 | Frieaizen |
| 2005/0030226 A1 | 2/2005 | Miyamoto et al. |
| 2005/0200516 A1 | 9/2005 | Brown |
| 2006/0262013 A1 | 11/2006 | Shiroma et al. |
| 2009/0232188 A1 | 9/2009 | Guenther et al. |
| 2011/0084879 A1 | 4/2011 | Brown et al. |
| 2012/0106659 A1 | 5/2012 | Fireaizen et al. |

\* cited by examiner

TRANSPONDER DEVICE

TECHNOLOGICAL FIELD

The invention relates to transponder/repeater device configured for receiving and transmitting electro-magnetic signals.

BACKGROUND

Radio frequency transponders are used in variety of applications. A typical transponder system operates to collect an electromagnetic signal/waveform and transmit a response signal/waveform, being similar to the collected signal or not.

For example, the known in the art Van-Atta type repeater is disclosed in U.S. Pat. No. 2,908,002. The Van-Alta type repeater is a passive electromagnetic device for receiving an incident electromagnetic wave and transmitting the received wave back in the direction from whence it has been received. The device includes a linear array of no less than four antennas, and means providing electromagnetic paths of equal length between antennas disposed symmetrically with respect to a geometrical center of said linear array.

U.S. Pat. No. 3,736,592 discloses a method and apparatus for obtaining automatic, selective retrodirective beam formation from a circularly symmetric antenna array. This system may be employed in an active or passive manner and accomplishes selective retrodirectivity by manipulation of beam terminals of a multiple beam matrix which in turn controls a multimodal network. The combination of the two matrix networks provide N separate beams from the circular antenna array. Also, by providing gain networks, control of the reradiated beam pattern is possible. This system has the ability to identify the angle of incidence of any particular transmission, and is particularly suited for navigational beacon systems since the reradiated signal can provide bearing information in response to interrogation.

Another example of a radio frequency transponder/repeater is disclosed in U.S. Pat. No. 4,806,938. Here, an array of receiving antenna elements is coupled to an array of transmitting antenna elements to provide a directional antenna system and including additionally an internal radio frequency source which is also coupled to the array of transmitting antenna elements. With such arrangement, an internally generated signal provided by the radio frequency source may be transmitted using the transmitting array of the Van Atta System.

GENERAL DESCRIPTION

There is a need in the art for a novel transponder/repeater system providing robust and reliable operation with high tolerance to failure of one or more of its hardware components. There is also a need in the art for a transponder/repeater system capable of collecting and transmitting radio frequency (RF) signals/waveforms with predetermined angular shift between the propagation directions of the collected transmitted and waveforms. Additionally, there is a need for a transponder/repeater system capable of recording the collected signals and responding to the collected signals with a desired time delay between the collected and transmitted signals. There is also a need in the art for a transponder system capable of applying coding to transmitted signals/waveforms corresponding to certain received waveforms such as to encode information to the transmitted waveform for example by modulating the transmitted signal with respect to the collected signal.

The present invention provides a transponder/repeater system capable of operating as a transponder and/or repeater and for clarity will be referred herein below as "transponder". However, the term "transponder" referring to the device should be interpreted as referring to repeater as well as to transponder systems, and describing retro-repeater and directional repeater systems as well.

The transponder of the present invention utilizes a plurality of antenna elements arranged in one or two arrays having a predetermined geometry and spacing between the elements. The antenna elements are paired between them to define receiving-transmitting pairs of antenna elements, i.e. each receiving element is paired/interconnected with a dedicated transmitting element via a transmission module associated with the respective receiving-transmitting pair. The receiving-transmitting pairs with their respective transmission modules operate independently from one another and are configured such that the transmitting element of each pair is capable of transmitting RF signals corresponding to RF signals collected by the receiving element of the pair.

In general, the transponder of the invention is adapted to collect, via its plurality of receiving elements, electromagnetic (EM) radiation/waveform of a predetermined wavelength range(s) (e.g. radio frequency (RF) waves) and radiate via its plurality of transmitting elements, a corresponding waveform of EM radiation while manipulating certain properties of the waveform being radiated with respect to the collected radiation. Specifically the transponder may be configured and operable to generate the radiating waveform with a certain desired angular shift with respect to the direction of propagation/reception of the waveform being collected and/or introduce a time delay between the collected and transmitted waveforms and/or apply certain coding to the transmitted waveform (e.g. frequency/amplitude modulation/coding may be applied to encode data/information in response to interrogation data/trigger provided by the collected signal or from other source).

To this end, each of the transmission modules, which is respectively associated with the receiving-transmitting pair, is adapted to receive an electric signal indicative of at least a portion of the received waveform collected by its respective receiving element (this may be the entire waveform as collected in a single antenna element); to record the electric signal and possibly apply certain manipulation thereto; and to transmit the recorded signal (manipulated or not) via its respective transmitting element to form, together with the signals transmitted with the transmitting elements of other receiving-transmitting pairs, a collective output/radiated waveform. Typically, the transmission modules are adapted to manipulate the received/recorded electric signals, prior to their retransmission, by applying a certain desired/predetermined time delay and/or phase delay to the signals, and/or by modulating the signals in order to change the properties of the radiated/output signal as described above.

Indeed, the transmission modules of different receiving-transmitting pairs may be operated independently from one another. Nevertheless, the signal manipulations, which are respectively introduced by the transmission modules, may be coordinated (e.g. predefined in advance or adjusted in real time) such as to affect the property or properties of the collective radiated waveform/beam which is collectively formed by the plurality of transmitting elements.

Preferably, according to the present invention, the transmission modules of the receiving-transmitting pairs are separate independent modules each dedicated to operate with a certain receiving pair. This provides a robust transponder configuration having improved reliability. This is at least because in such configuration, failure in one or more of the transmission-modules, or their respective receiving-transmitting pairs, (e.g. failure in the minority of them) does not significantly impair the collective output radiated waveform. Specifically, the transmitted waveform is generated by the plurality of transmitting elements and is generally formed as a collective interference pattern, and thus failure of one of the elements (e.g. expressed as "dark spot"/grating-defect) would not impair the total collective output waveform structure.

Each of the transmission modules connecting the different receiving-transmitting pairs comprises a sampler adapted for digitizing RF signals, a memory unit connectable to said sampler and capable of storing a digital representation of the RF signals, and a signal generation module (e.g. including a digital to analogue converter and signal amplifier) connectable to the memory unit and capable of generating RF signals based on digital representation of signals stored in the memory unit. The transmission modules of different pairs are configured to transmit signals received from the respective receiving elements, store digitized representation of the received signals and transmit corresponding signals through the transmitting elements of the pairs respectively. The corresponding transmitted signal may be a replica of the received signal and transmitted with a predetermined temporal delay or not, as well as may be a modulated version of the collected (received) signal.

For example, the transmission module may include a Digital Radio Frequency Memory (DRFM) module, configured to sample, record (store) and retransmit RF signals. The configuration and operation principles of DRFM and DRFM-based systems are known in the art and thus will not be described herein in details. It is however noted that a typical DRFM is operable for digitizing incoming RF signals of predetermined frequency range; storing the digitized signals; and, when required, reconstructs the digitize representation to generate an output RF signal being a duplicate of the incoming signal.

The receiving and transmitting antenna elements are paired between them in accordance with position of the respective antenna elements within the arrays in order to provide desire waveform of the collective transmitted signal. The antenna elements may typically be paired to form the receiving-transmitting pairs in a sequential or in reverse order with respect to the arrangement/positions of respective antenna elements in the receiving and transmitting antenna arrays. For example, the antenna elements are paired in reversed order (e.g. similar to Van Atta type transponder) or paired in a direct order (e.g. opposite to that of Van Atta type transponder). The transponder of the invention may thereby repeat an RF signal collected from a certain direction while with a predetermined angular shift (which may be zero or not). The directionality of the transmitted (e.g. repeated) signals is a result of appropriate phase variations between different transmitting elements of the array, which correspond to phase variations of the signals being collected by the receiving elements. It should be noted that the antenna elements may be of any known suitable type/configuration including but not limited to electric dipole antenna, magnetic dipole antenna and/or monopole antenna and/or spiral antenna.

The correspondence between directionality of collected (received) signals and of the corresponding collective transmitted signal is a result of phase variations between signal components received by different receiving elements and transmitted by their corresponding transmitting elements. To this end, the receiving and transmitting antenna elements are arranged in first and second arrays respectively, having a predetermined geometry (e.g. linear array, circular array, polygonal array etc) and spacing between the different elements of each array (e.g. equal spacing between elements). It should be noted that the first and second arrays may be spatially separated arrays of antenna elements or may be configured as combined/overlapping in space arrays, for example the antenna elements of the two arrays may be arranged in alternating/interlaced fashion (e.g. inter-digital/interlaced arrays) thereby forming a single array of antenna elements. In addition it should be noted that one or more receiving antenna elements associated with one receiving-transmitting pair may also operate as a transmitting element being associated with the same or other pair.

To this end, according to some embodiments of the invention, the receiving-transmitting pairs of the transponder are configured with signal connection lines having substantially similar electrical-path length (e.g. associated with the similar time delays) for signals transferred thereby from the receiving element of their receiving-transmitting pair, through its associated transmission module, and to the corresponding transmitting element. More specifically, an effective (full) connection line, including any connection line between the receiving element to the transmission module, and from the transmission module to the transmitting element, as well as inside the transmission module itself, is equal for all the pairs in length of the connection line and in electrical properties.

Alternatively, the different transmission modules may be configured to apply tunable delay to signals passing therethrough, such that the overall delay applied to signals passing through all the receiving-transmitting pairs of the transponder of the invention is substantially similar. Generally, the receiving-transmitting pairs of antenna elements are configured such that a temporal delay and phase variations of signal collected by the receiving element and transmitted by the corresponding transmitting element is substantially equal between all the pairs in the transponder.

The use of equal temporal delay and phase variations, together with appropriate geometrical configuration of the arrays of antenna elements, enable the transponder to provide directional relation (e.g. predetermined relation) between the directions of the collected RF signals and the directions of the corresponding transmitted signals. For example, the transponder of the invention may be configured such that upon collection of RF signal from a certain direction, a similar signal, or variation thereof, is transmitted with predetermined temporal delay, back towards the origin of the collected signal. Alternatively or additionally, the transmitted response signal may be directed at a different direction, being within a predetermined angular shift with respect to the direction of collection the collected signal. In this regards it should be understood, that the directions of the received waveforms/signals need not be measured or estimated. To this end, the invention may be used to provide auto-repetition of signals with predetermined angular shift between received and transmitted waveforms which depends, or is adjusted, in accordance with the geometries of the receiving and transmitting arrays and their relative orientations and/or by proper wiring/pairing of the receiving and transmitting antenna elements. In this respect, the auto-repetition of the signals is not dependent on detection of the received signals and/or on analysis/estimation of the direction(s) of arrival of the received signals.

According to one broad aspect of the present invention there is provided a transponder system including a plurality of antenna elements. The plurality of antenna elements includes first and second arrays of receiving and transmitting antenna elements. Each of the first and second arrays includes antenna elements arranged in a spaced apart relationship with a predete mined spacing. The antenna elements of the first array are connected to dedicated antenna elements of the second array in accordance with positions of the antenna elements within the arrays, thereby forming receiving and transmitting pairs of antenna elements which are operable together to receive an input signal and transmit a collective output signal indicative thereof. The antenna elements of each pair are connected to one another via a respective transmission module. Each of the transmission modules of the antenna element pairs includes a sampler adapted for digitizing signals received by the receiving antenna element of the corresponding pair, a memory connectable to the sampler and capable of storing digital representation of the received signals, and a signal generation module connectable to the memory and capable of generating, from the digital representation, a signal to be transmitted by the transmitting antenna element of the corresponding pair. The generation of the signal to be transmitted includes introducing a predetermined temporal delay of the signal to be transmitted with respect to the received signal. The transponder thereby provides a predetermined angular shift between a waveform of the input signal and a waveform of the collective output signal.

According to some embodiments of the transponder system of the invention, the antenna elements of the first and second arrays are connected in pairs in accordance with their respective positions such that the collective output signal propagates in substantially same direction as a direction of the received input signal (i.e. oriented by 0° with respect thereto) and/or in opposite direction (i.e. oriented by 180° with respect to the received input signal). Alternatively or additionally, according to some embodiments the antenna elements of the first and second arrays are connected in pairs in accordance with their positions such that the collective output signal propagates in a direction different from a direction of the received input signal (e.g. with a predetermined angular shift with respect to the received signal).

In some embodiments of the invention the first and second arrays of antenna elements are located in regions spatially separated from one another. Alternatively or additionally according to some embodiments the antenna elements of the first and second arrays are arranged in interlaced/alternating fashions.

In some embodiments the first and second arrays of the antenna elements have substantially similar geometry each forming a linear array, a closed loop array and/or an array of other geometry (e.g. curved/arc-shaped array). Additionally, the spacing between the antenna elements of the first array may be substantially similar to the spacing between the antenna elements of the second array.

It should be noted that according to some embodiments the antenna elements of the first and second arrays are arranged along two intersecting axes respectively, thereby inducing an angular shift between the input and collective output waveform/signals.

According to some embodiments of the present invention each of the transmission modules, which are associated respectively with the receiving and transmitting pairs, includes a Digital-Radio-Frequency-Memory (DRFM) module. The transmission modules may be configured to generate substantially equal time delays between the received and transmitted signals which are respectively received and transmitted by their receiving and transmitting antenna pairs corresponding thereto. According to some embodiments of the present invention each of the transmission modules includes a signal processing module adapted for applying predetermined modulation to data indicative of the received signal.

In some embodiments the receiving and transmitting antenna elements of a receiving and transmitting pair are associated with different polarizations of the radiation respectively received and transmitted thereby. For example receiving and transmitting antenna elements of each pair may be differently oriented with respect to radiation propagation direction. The different orientation between receiving and transmitting antenna elements of the pairs affects the polarization of the signal such that the transmitted signal has different polarization relative to a polarization of the signal being received by the receiving antenna element of the pair. Alternatively or additionally the polarization of the transmitted signal may be changed by other means, for example by utilizing a polarizer in the reception or transmission path. Yet alternatively or additionally, different type of antennas may be used for the receiving and transmitting antennas of a receiving and transmitting pair which are associated with different polarizations. For example a spiral antenna may be used as the receiving antenna of a certain pair and a dipole antenna may be used as the transmitting antenna of the pair. According to some embodiments of the transponder system of the present invention, at least some of the antenna elements of the receiving and transmitting pairs are configured for both receiving and transmitting EM signals. In some cases, an antenna element, of a certain receiving and transmitting pair of antennas, may be configured for both receiving and transmitting EM signals. Additionally, such an antenna element may also be part of at least one additional pair and may be connected, via at least one additional transmission module, to another antenna element thereby forming the additional pair of receiving and transmitting antenna elements respectively. Yet additionally, in some cases in which antenna elements, or some of them, serving as both receiving and transmitting antennas, at least one of the transmission modules may be configured as a two-part unit interconnected between antenna elements of the pair a receiving and transmitting pair in which pair each antenna element is configured for both receiving and transmitting EM signals. Accordingly such a transmission module may provide bi-directional signal transmission with by its respective pair of antenna elements.

According to another broad aspect of the present invention there is provided a signal transmission network including two or more transponder systems configured according to the present invention as described above and will be further described below. The two or more transponder systems are arranged at certain locations along a predetermined signal propagation trajectory such that two successive transponder systems are spaced from one another by a segment of the signal propagation trajectory. The angular shift, which is provided by each of the transponder systems, is selected in accordance with an angle between a preceding segment from which the input waveform is received at the transponder system and a successive segment. Accordingly the transmission network of the invention utilizes a deployed network of transponder systems to rout signals along a predetermined signal propagation corridor (path/trajectory).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A shows a configuration where the antenna elements are paired in reverse order relative to their location, FIG. 2B shows a configuration where the antenna elements are paired in direct order, and FIG. 2C shows a configuration where the antenna elements are arranged in interlaced fashion;

DETAILED DESCRIPTION OF EMBODIMENTS

Figure 1:
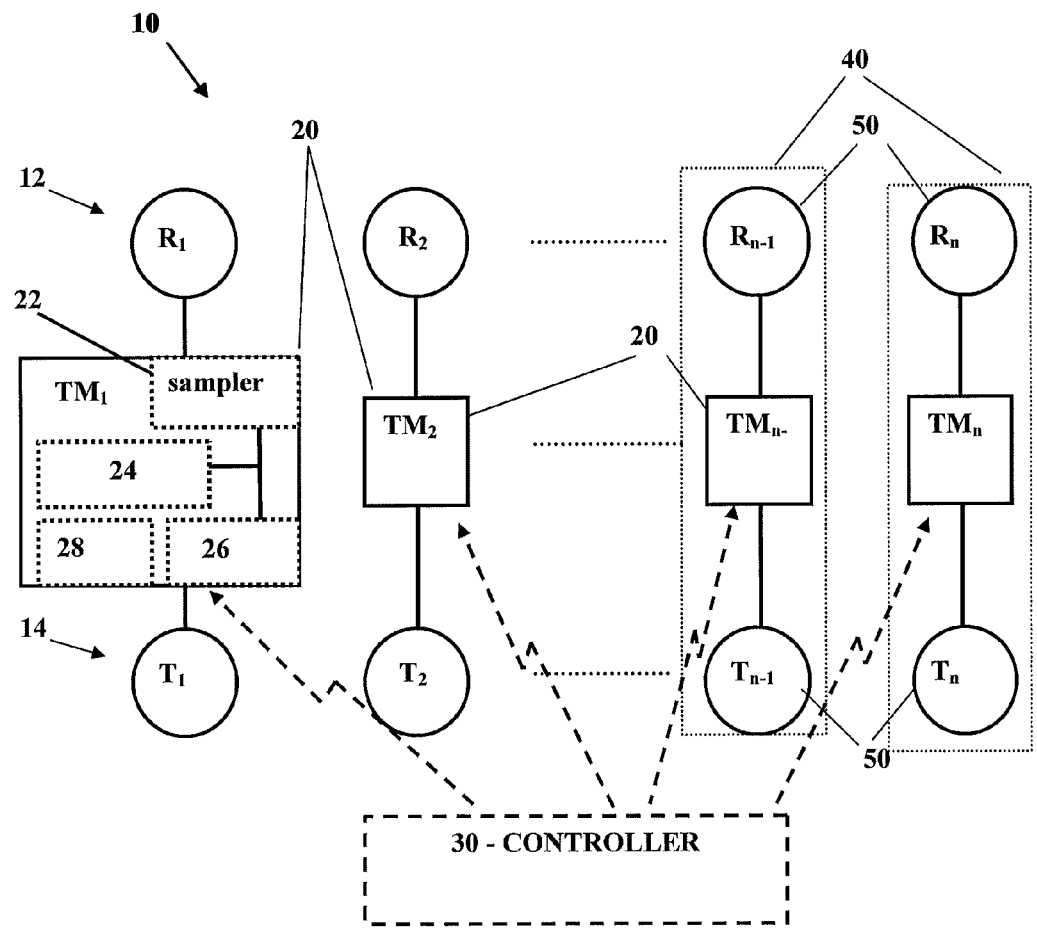
FIG. 1 schematically illustrates the configuration of a transponder system according to the present invention.

Reference is made to FIG. 1 illustrating a signal transponder/repeater system 10 according to the present invention. The transponder/repeater system 10 is configured for re-transmitting a collected signal, typically electromagnetic (EM) radiation at radio frequency (RF). The transmitted signal is an identical (possibly amplified) replica of the collected signal, or a modulated/coded variation thereof, having a predetermined time delay relative to the collected signal. Additionally, the transponder system 10 is capable of generating an output signal having certain waveform and specific direction of propagation, being with a predetermined angular shift with respect to direction of propagation of the collected signal. As noted above, the output signal may be generated automatically with a predetermined angular shift with respect to the collected signal while obviating a need to detect the collected signal, and/or to measure/estimate the direction of the collected signal received by the transponder system 10.

Transponder system 10 includes first and second arrays, 12 and 14 respectively, of antenna elements 50 and a plurality of transmission modules 20. The antenna elements 50 include a plurality of receiving elements $R_1$-$R_n$ and transmitting elements $T_1$-$T_n$ which are respectively associated with the first and second arrays 12 and 14. The receiving elements $R_1$-$R_n$ and transmitting elements $T_1$-$T_n$ are paired together to form plurality of receiving-transmitting pairs 40 each including a receiving element $R_i$ and a transmitting element $T_i$ which are connected together via corresponding transmission module $TM_i$. To this end, independent transmission modules 20 $TM_1$-$TM_n$ are respectively interconnected between the receiving elements $R_1$-$R_n$ and transmitting elements $T_1$-$T_n$ to form the independently operating receiving-transmitting pairs 40.

The first and second arrays, 12 and 14 are generally associated with similar geometries such as to enable coherent reconstruction of a waveform received by one for repeating this waveform by utilizing the other array. The geometries of the arrays may for example include linear arrays, curved/arc-shaped arrays, closed loop arrays as well as other suitable geometries. It should be noted that, although the arrays are of similar geometries/shapes, according to some embodiments of the present invention the spacing between the elements of each of the arrays may be different and accordingly the sizes of the arrays.

Specifically, each receiving-transmitting pair 40 includes a receiving element $R_i$ which is adapted for collecting/receiving electromagnetic signals/radiation propagating in its vicinity, a transmission module $TM_i$ connected thereto and adapted for recording the signals received thereby, and a transmitting element $T_i$ connected to the transmission module $TM_i$ and adapted for receiving therefrom signals to be transmitted. The receiving-transmitting pairs 40 including their respective transmission modules may thus operate independently from one another, each for repeating/transponding to the portion of the waveform received by its receiving element. However, although the receiving-transmitting pairs 40 operate independently from one another, the signal manipulation (time delay and/or frequency/amplitude modulation), which is introduced by each of them, may be adjusted (e.g. preconfigured and/or synchronized in real time by an external module such as controller 30) in order to generate, by all the receiving-transmitting pairs, a desired collective transmitted waveform having a predetermined/desired relation (angular shift/modulation) with respect to the waveform received by all of the receiving-transmitting pairs.

Generally, each of the transmission modules 20 includes a sampler 22, a memory unit 24 and a signal generation unit 26, and configured to receive electric signals, store a digital representation thereof and transmit a corresponding output signal with a predetermined temporal delay. Some or all of the transmission modules 20 may be Digital-Radio-Frequency-Memory (DRFM) modules. The construction and operation of such DRFM modules are known per se and therefore need not be described in details, except for noting that a DRFM system digitizes an incoming RF input signal at a frequency and bandwidth necessary to adequately represent the signal, and reconstructs that RF signal when required. The general aspect of DRFM is that it produces a digital "duplicate" or "replica" of the received signal, which is coherent with the source of the received signal. DRFM may modify the signal prior to retransmitting.

Each of the transmission modules 20 is configured to receive an electric signal from the associated receiving element $R_i$, record data indicative of the electric-signal (e.g. the electric signal itself or a certain functional/representation thereof), and utilize the recorded data for generating output signal to be transmitted by the associated transmitting element $T_i$. According to some embodiments of the invention, the transmission modules 20 ($TM_1$-$TM_n$) are adapted to apply/introduce predetermined manipulation, such as temporal delay(s) and/or signal modulation(s), to electric signals generated thereby. Such manipulations may be used to control/predefine the relative angular shift between the received and collectively transmitted waveforms and/or apply data/coding to the transmitted waveform.

Indeed, each of the transmission modules 20 ($TM_1$-$TM_n$) is part of a corresponding receiving-transmitting pair 40 and may be operated independently from transmission modules 20 ($TM_1$-$TM_n$) of other pairs. Nevertheless, signal manipulations applied by different transmission modules 20, associated with different receiving-transmitting pairs 40 are coordinated to form together an appropriate waveform of the collective transmitted output EM signal.

The transponder system 10 of the present invention is configured such that in response to a received EM signal having certain waveform, where multiple receivers receive the same signal but with different phase shifts defined by their relative positions, and the transponder system 10 transmits a corresponding collective EM output signal. The transmitted signal may have a predetermined temporal delay, angular shift and/or other signal modulations with respect to the received signal. More specifically, the transponder system 10 is configured to affect one or more of the following properties of the transmitted signal with respect to the received signal:

The transponder system 10 may be configured to affect direction of propagation of the collective transmitted signal, by introducing an angular shift to the direction of propagation of the transmitted signal/waveform relative to that of received signal. Such angular shift is formed by interference of the signals transmitted by the different transmitting elements $T_1$-$T_n$ which is defined by configuration of the array of transmitting elements, namely its direction/orientation in space, geometry, and spacing between the elements $T_1$-$T_n$ as well as the relation between this configuration and the configuration of the corresponding array of receiving elements $R_1$-$R_n$.

The transponder system 10 may be configured to introduce a time delay between the transmitted waveform and the received waveform.

The transponder system 10 may be configured to apply coding to the transmitted waveform as compared with the received waveform. Such coding may include frequency and/or amplitude modulation and/or various other types of manipulations as will be described further below.

Thus, the invention provides a robust transponder system 10 utilizing multiple independent transmission modules 20 respectively interconnecting receiving and transmitting pairs 40 of antenna elements 50 for "repeating" received waveforms. As described above, the term "repeating" refers also to signal transmission utilizing various manipulation(s) applied to the waveform of the replica of the received signal. The multiple transmission modules 20 may be configured to operate in substantially independent manner for forming the output collective waveform. This, in turn, improves the reliability of the system as failure of any one single transmission module does not significantly impair the system's operation.

As noted above, each transmission module $TM_i$ generally includes a sampler 22 (e.g. A/D converter), a memory module 24 connected thereto for recording electric signals sampled by the sampler 22, and a signal generating module 26 connected to the memory module 24. Optionally, the transmission module $TM_i$ also includes a signal processing module 28 which will be further described below. In some embodiments of the invention, the transmission modules may be or may include DRFM module implementing the functionality of at least some of the sampler 22, memory module 24 and/or the signal generating module 26.

The sampler 22 is configured to receive an analog electric signal and generate a digital representation thereof. This digital representation of the signal can then be stored in the memory module 24 and/or undergo other signal manipulation(s) as the case may be. Signal generating unit 26 is connected to the memory module 24 and configured to receive the digital representation of an input analog signal and generate an output analog electric signal based on said digital representation of a signal being stored in the memory module 24.

According to some embodiments of the present invention, the receiving and transmitting arrays 12 and 14 have similar geometry/shape and spacings between their antenna elements, and the transmission modules 20, which are respectively associated with the receiving-transmitting antenna element pairs 40, have similar configurations and are configured to apply similar manipulations to the electric signals received thereby. For example, in operation, the transmission modules 20 may be adapted to receive a signal from the receiving element (e.g. $R_1$) of the pair, store a digital representation of the signal in the memory module 24 for a certain/predetermined duration which is fixed for all the transmission modules 20 (e.g. a few milliseconds, a few seconds or for other periods time), and transmit a corresponding signal (or a sequence of corresponding signals) to the corresponding transmitting elements (e.g. $T_1$) of the pair 40. As noted above, the transmitted signal may be similar to the received signal with a predetermined temporal delay, or a modulated version of the received signal, where all of the transmission modules are configured to apply a similar modulation to signals passing therethrough. Thus, an incoming waveform received by the receiving antenna elements ($R_1$-$R_n$) may be retransmitted one or more times with a predetermined time-delay(s), angular shift and/or modulation affected on the output waveform(s) which is generated by the transmitting antenna elements ($T_1$-$T_n$).

According to the present invention, a relative angular shift between the collected and transmitted waveforms may be generated by utilizing at least one of the following: (i) providing a certain relative angular orientation between the receiving 12 and transmitting 14 arrays; (ii) utilizing various possible interconnection/wiring schemes to pair the receiving antenna elements 50 of the receiving array 12 with the corresponding transmitting antenna elements of the transmitting array 14 in accordance with their relative positions within the arrays, as will be further described with reference to FIGS. 2A-2C; (iii) adjusting a difference between the time delays applied by the transmission modules 20 of different receiving-transmitting pairs, and thereby affecting appropriate phase differences between the signals transmitted by the different transmitting antenna elements $T_1$-$T_n$ to control the direction of propagation of the collective transmitted waveform with respect to the array 14 of transmitting elements and thereby controlling the relative angular shift between the received and transmitted waveforms.

As also shown in FIG. 1, the transmission modules 20 may include a signal processing module 28 connected to the memory module 24 and to the signal generating unit 26. The signal processing module 28 is configured to apply predetermined modulations either to the digital representation of the signals as stored in the memory module 24, or to the analog signals generated by the signal generating unit 26, or carry out both of these modulations, to thereby provide output signal in the form of a manipulated version (modulated version and/or delayed version) of the input signal received from the corresponding one of the receiving elements $R_1$-$R_n$. The manipulated version of the output signal may be stored in memory module 24 for delayed retransmission.

Additionally, the signal processing module 28 may be preprogrammed and operable to operate the signal generating unit 26 to generate appropriate signals (pattern) in accordance with predetermined scheme. For example, the signal processing module 28 may be preprogrammed to modulate the frequency and/or amplitude of all (or at least some) of the received signals (or their digital representation stored in the memory module 24), to thereby encode the corresponding output/repeated signals.

Alternatively or additionally, the signal processing module 28 may be responsive to a trigger (e.g. reception of a predetermined signal via the sampler 22) and adapted for operating the signal generating unit 26 to generate an output response signal based on certain pre-stored data which is stored in the memory module 24. In this connection, the transponder system 10 of the invention may be configured for responding to a certain received waveforms by generating predetermined output signals, which, upon being transmitted, form together a predetermined collective output waveform propagating in a predetermined direction having a predetermined relation to the direction of the waveform of the trigger signal.

According to some embodiments of the present invention, the transponder system 10 is associated with a controller 30 capable of communicating (e.g. by wires or wireless data exchange) with the transmission modules 20. The controller 30 is capable of providing the individual transmission modules 20 with data indicative of required signal manipulations to be performed on signals being transmitted, in response to received signals, to thereby generate a desired output waveform. For example, the controller 30 may coordinate the operation of the individual transmission modules 20 to effect/vary time delays, signal modulation/coding, angular shift between the received and transmitted waveforms and/or generation of predetermined signal applied thereby. In this connection, the controller 30 may operate to communicate (bilaterally) with the transmission modules 20 or it may be configured for broadcasting triggering-signals/instructions to synchronize and/or operate the transmission modules 20.

According to some embodiments, the controller 30 which is associated with the plurality of transmission modules 20, is adapted to receive therefrom data indicative of the collected waveforms (e.g. duly recorded for each of the respective receiving antenna channels). The controller 30 may process such data about the different receiving channels and identify/determine corresponding signal portions of interest in a collectively received waveform. For example, the controller 30 may be equipped with a signal analyzer capable of determining the frequency(ies) and or direction(s) of the received signals (defining together the collectively received waveform) and determining/selecting portions of the received waveform which are of interest and should be transponded or repeated by the system of the present invention. An example of such a signal analyzer is described in U.S. Pat. No. 8,022,874 assigned to the assignee of the present application. Having determined the selected signal portions of interest, the controller 30 may then be configured to generate instruction data to the transmission modules 20 for generating corresponding electric signals to be transmitted by their associated transmitting elements $T_i$ to form a desired collective waveform in response. To this end, the controller 30 together with the analyzing unit may be configured and operable to filter out signal clutter and non-relevant signal portions from the received signals, and operate the transponder system 10 to respond only to received signals selected as those having predetermined parameter or parameters (e.g. signals arriving from a predetermined direction(s) and/or with predetermined frequencies).

As indicated above, antenna elements 50 of the first 12 and second 14 arrays are connected via the transmission modules $TM_1$-$TM_n$ to form receiving-transmitting pairs 40. The receiving-transmitting pair is configured such that EM waveform portion (e.g. carrying RF signal) collected by the receiving element of the pair (e.g. by element $R_1$), and transformed by the antenna element to electric signal, passes through the respective transmission module to be transmitted again as EM waveform (carrying corresponding RF signal) by the associated transmitting element $T_1$. The arrangement of the antenna elements 50 in the first and second arrays 12 and 14, and the interconnections between the elements, are configured to enable the transponder 10 of the present invention to collect signals and automatically generate a corresponding signal transmitted in a direction corresponding to a direction of the collected signal (i.e. being at a certain angular relation with the direction of the collected signal).

The antenna elements 50 are interconnected between them to form receiving-transmitting pairs 40 in accordance with the respective location of the different elements within the first 12 and second 14 arrays. This pairing of the antenna elements 50 enables directional repeating of collected waveforms/signals thereby transmitting corresponding output waveforms/signals in response to collected signals and in certain direction being at a predetermined angular shift/relation with respect to a direction to the origin of the collected signal. The directionality of the transmitted signal is a result of phase variations between signal components transmitted by the different transmitting elements $T_1$-$T_n$. More specifically, the transponder 10 may be configured such that the lengths of connection lines, including the transmission modules 20, are equal preserving phase variations between different antenna elements 50. The collective output waveform is then transmitted being formed by signals by the transmitting antenna elements and having the same phase variations.

Figure 2A:
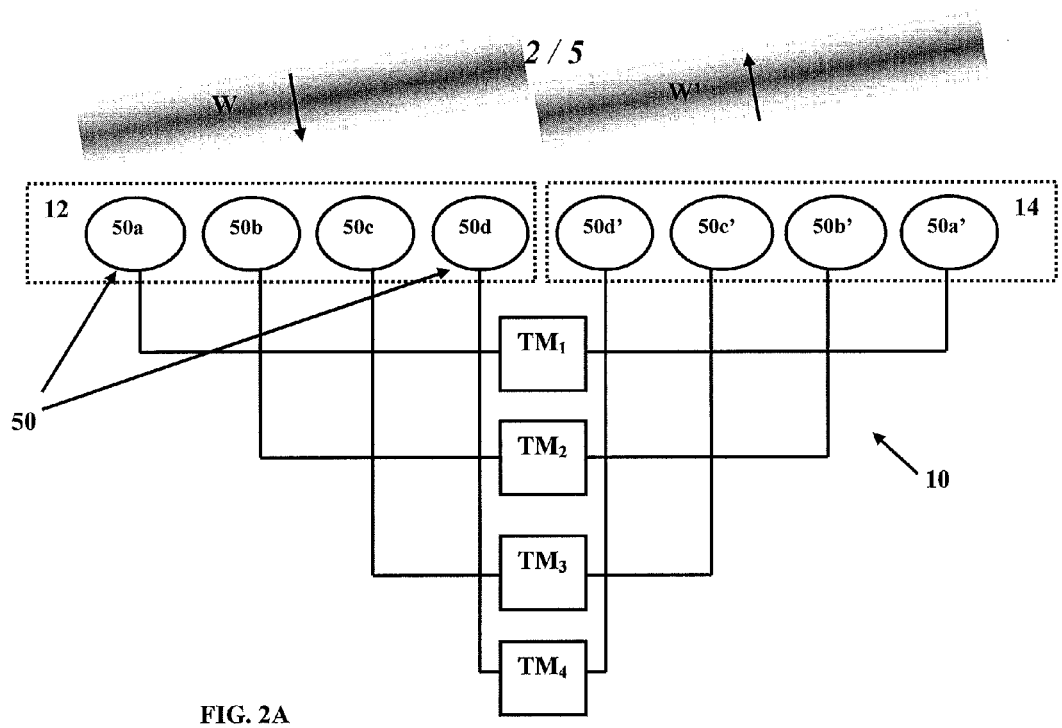
FIGS. 2A-2C show three examples of transponder system according to the present invention.
Figure 2B:
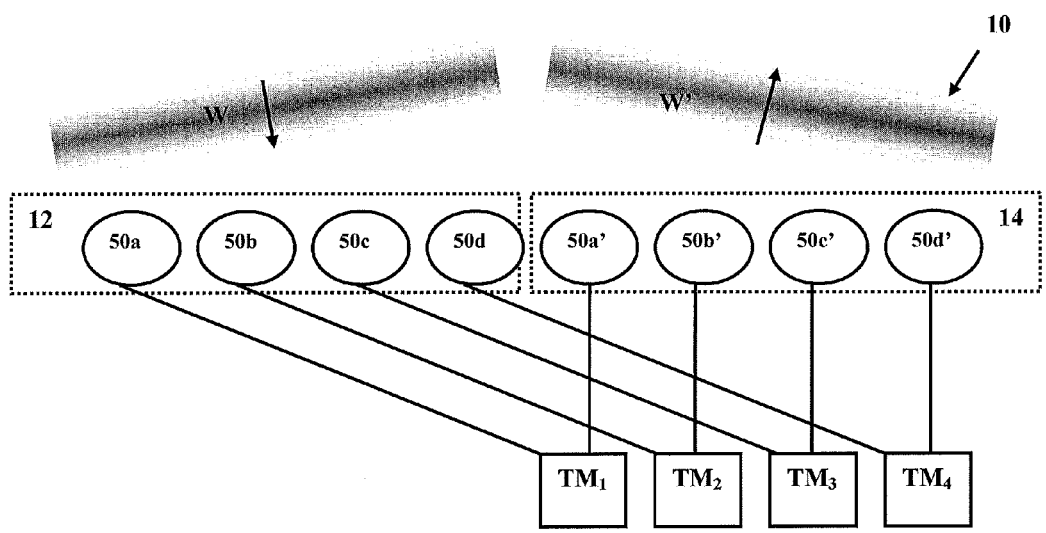
Figure 2C:
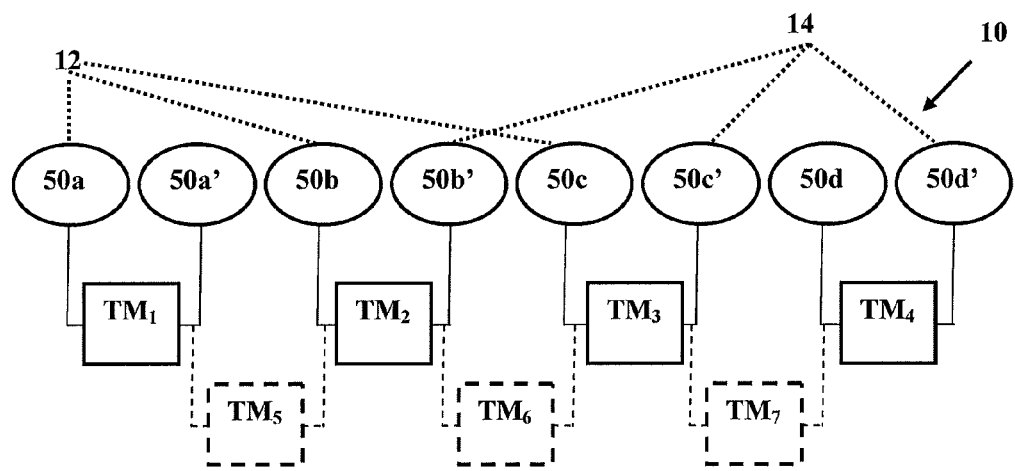

Thus, in some embodiments, a relative order of receiving antenna elements and their associated transmitting antenna elements is typically utilized to provide a desired phase shift. This is illustrated in FIGS. 2A-2C showing specific but non-limiting examples of a transponder system 10 which includes receiving and transmitting antenna elements 50 (in this non-limiting example eight such elements are shown) arranged in first and second linear arrays 12 and 14. Eight such elements are exemplified arranged to form four transmitter-receiving pairs 50a-50a', 50b-50b', 50c-50c' and 50d-50d'. Each receiving element of the first array 12 is connected to a respective transmitting element in the second array through a corresponding one of the transmission modules $TM_1$-$TM_4$.

In the transponder of FIG. 2A the antenna elements 50 are interconnected in reverse order with respect to their position in the arrays, while in the transponder of FIG. 2B the antenna elements 50 are interconnected in accordance with the direct order of their position. Assuming that all of the transmission modules are configured to operate in a similar manner with respect to input waveform W, i.e. apply similar time delay and similar signal manipulations, the collective output waveform W' transmitted by the transponder 10 configuration of FIG. 2A will be directed back to the direction from which the collected signal W arrives (i.e. the transponder operates as retro-repeater). More generally, in the configuration of FIG. 2A the output waveform W' propagation angle with respect to the broadside of the array 14 substantially equals the angle arrival of the incoming waveform W with respect to the broadside of the array 12. In FIG. 2B, where the antenna elements 50 are in direct-order interconnection, the output waveform W' transmitted by the transponder configuration is directed with an angular shift with respect to the direction of propagation of the collected waveform W (e.g., the output waveform W' propagation angle with respect to the broadside of the array 14 being the negative of angle arrival of the incoming waveform W with respect to the broadside of the array 12).

In the example of FIG. 2C the receiving and transmitting antenna elements 50 of the transponder system 10 are arranged in an alternating/interlaced manner, forming first and second interdigital arrays and defining antenna element pairs 50a-50a', 50b-50b', 50c-50c' and 50d-50d' associated with transmission modules $TM_1$-$TM_4$ respectively. As also shown in FIG. 2C, the transponder system 10 may further include additional transmission modules $TM_5$-$TM_7$ forming additional receiving-transmitting pairs 50a'-50b, 50b'-50c and 50c'-50d. In this example, each antenna element or at least elements 50a', 50b, 50b', 50c, 50c', 50d are configured/used as both receiving and transmitting elements while associated with different pairs. Thus, in this example the first and second arrays of antenna elements 50 are generally arranged in spatially overlapping fashion (arranged in interlaced manner) and as at least some of them function as transmitter/receiver and additional transmission modules are provided, the entire arrangement actually define seven pairs of transmitting-receiving elements. Additionally, in such configuration of FIG. 2C, each receiving-transmitting pair of antenna elements may be bi-directionally operated, provided that the respective transmission module is appropriately configured for bi-directional signal transmission/conversion as will be described further below. This enables bi-directional communication and allows each antenna element to operate both as transmitting element and as receiving element for the same receiving-transmitting pair. Thus, in some configurations the transponder system may include the additional transmission modules $TM_5$-$TM_7$, operating some of the antenna elements 50 as receiving elements for one pair and as transmitting elements for its adjacent pair.

In this connection it should be noted that the receiving and transmitting antenna elements may generally have similar configuration and the connection to the respective transmission module, i.e. connection to the sampler 22 or to the signal generating unit 26 thereof, determines the operation/use of a specific antenna element as receiving or transmitting one. However, in some configurations, e.g. as shown in FIG. 2C, the transmission modules may be configured as bi-directional modules capable of switching the direction of signal transmission/conversion within the antenna element block. Also, the bi-directional operation of the transmission module may be achieved by configuring the transmission module as a two-part device including two uni-directional opposite transmission units (being in a single package or not) to thereby allow switching between operation of the antenna elements of the respective pair.

It should be noted that the arrays of receiving and transmitting antenna elements 50, as shown e.g. in FIGS. 2A and 2B, may or may not be arranged in the same plane as well as may or may not be arranged along the same axis. The configuration may be such that alignment of the arrays provides addition angular shift to the transmitted wavefront. Alternatively or additionally, additional control of the angular shift between the input and output waveforms W and W' may be introduced by using a predetermined relation between first and second spacings between the antenna elements in respectively the first and second (receiving and transmitting) arrays of antenna elements. In other words, the antenna elements of the first array are equally spaced from one another and this spacing may be differently from the spacing between the elements of the second array.

Specifically, for a waveform of frequency f and direction θ, the phase delay Δϕ between adjacent antenna elements depends on the spacing d between the elements and is given by $\Delta\phi=2\pi f \Delta t=2\pi(f*d/c)\sin\theta$. Therefore, a difference in the elements spacing, between the spacings $d_r$ in the receiving antenna array 12 and the spacings $d_t$ in the transmitting array 14, may be compensated by transmitting the signals at different frequency $f_t$ than the frequency of the received signals $f_r$, such that the relation $f_r d_r = f_t d_t$ is preserved in order to maintain coherency over for signals received/transmitted in various angles θ and avoiding grating lobes.

In some embodiments of the invention in which the elements spacing, is different in the receiving 12 and transmitting 12 antenna arrays ($d_r \neq d_t$), appropriate frequency divider are used for adjusting the frequency of the transmitted signals in accordance with that of the received signal. The relation between the frequencies of the transmitted and received signals is given by $f_t = f_r d_r / d_t = f_r / k$ (where $k \equiv d_t/d_r$) and thus a frequency multiplier/divider with multiplication/division factor K may be used to appropriately adjust the transmitted frequency $f_t$ such that it matches that of the received signals. Such a frequency multiplier/divider may be added to the transmission module $TM_i$ of each pair of receiving ant transmitting elements for adjusting the frequency(ies) of the signals transmitted by the pair. Such a frequency multiplier/divider module may be implemented utilizing any suitable technique known in the art. For example a frequency divider may be implemented utilizing shift register which is clocked by the input signal (e.g. clocked by the received signal). Alternatively or additionally, a frequency multiplier (multiplication module) may be used and may for example include a mixer for multiplying the signal frequency and a filter adapted to filter-out unwanted frequencies from the multiplication result. In some embodiments of the present invention, the frequency multiplier/divider may be specifically configured in accordance with the specific frequency which is to be received/transmitted by the system.

The antenna elements 50 may be arranged in a spaced-apart relationship along a closed-loop path, e.g. circular or polygonal path. These may be two spatially separated circular/polygonal arrays of receiving and transmitting antenna elements, or may be a common circular-polygonal array formed by interlaced arrangement of the receiving and transmitting elements. It should again be noted that, generally each antenna element is capable of operating as a receiver or transmitter, and the term receiving/transmitting array is used just in order to clarify the functional features of antenna elements in the specific device configuration.

Figure 3:
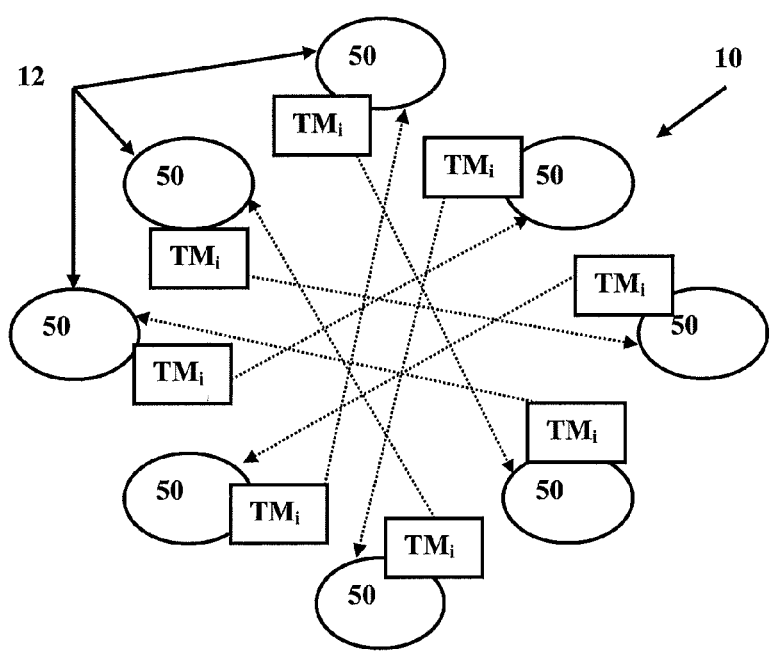
FIG. 3 exemplifies a transponder system where the antenna elements are arranged in a closed-loop array.

FIG. 3 exemplifies a transponder system 10 including a plurality of antenna elements 50 arranged along a closed-loop path forming an interlaced/overlapping configuration of the antenna elements arrays 12 and 14. In this example, the same antenna element is used as a receiver for one receiving-transmitting pair and as a transmitter for another receiving-transmitting pair and therefore in order to simplify illustration, all the elements are designated 50 and arrows 52 show, in a self-explanatory manner, the signal transmission/conversion direction within each pair and thus the functionality of the antenna element.

In this example, each of the antenna elements is associated with two transmission modules, generally at $TM_i$, and these two transmission modules connects said antenna element with two other antenna elements. One of the two transmission modules implements signal transmission/conversion mode from said antenna element, and the other transmission module implement signal transmission/conversion mode to said antenna element. This interconnection between the antenna elements 50 of the array via the transmission modules forms a plurality of receiving-transmitting pairs of antenna elements.

As indicated above, according to the invention, the antenna elements 50 are paired between them in accordance with their location to generate a desired angular shift between the received and transmitted waveforms. The example of FIG. 3 shows such interconnection between antenna elements 50 that each antenna element is connected to the antenna element shifted therefrom at about 160 degrees, or in other words, the antenna elements in the pair are 160 degrees shifted between them. Such configuration generates an angular shift of about 20 degrees between the direction from which a received waveform W arrives and the direction to which a corresponding transmitted waveform W' propagates. It should be noted that such closed-loop array(s) configuration of the antenna elements practically enables to apply any angular shift between the input and output waveforms W and W' by appropriately pairing the antenna elements to form receiving-transmitting pairs. Additionally, closed-loop configuration provides for omni-directional signal collection and transmission, i.e. enables the transponder system to be capable of collecting EM radiation arriving from any one or more directions within the 360 degrees space and transmitting a corresponding output waveform in a desired direction with a predetermined angular shift from the received waveform. As indicated above, a closed-loop configuration of the antenna elements 50 arrangement may also be realized by using two spatially separate arrays of antenna elements as shown in FIGS. 2A-2B wherein each of the arrays 12 and 14 would be configured as antenna elements arranged in spaced-apart relationship along a closed-loop (circular, polygonal, etc.) path and the antenna elements of one array are appropriately associated (connected) with antenna elements of the other array to form the receiving-transmitting pairs.

Figure 4:
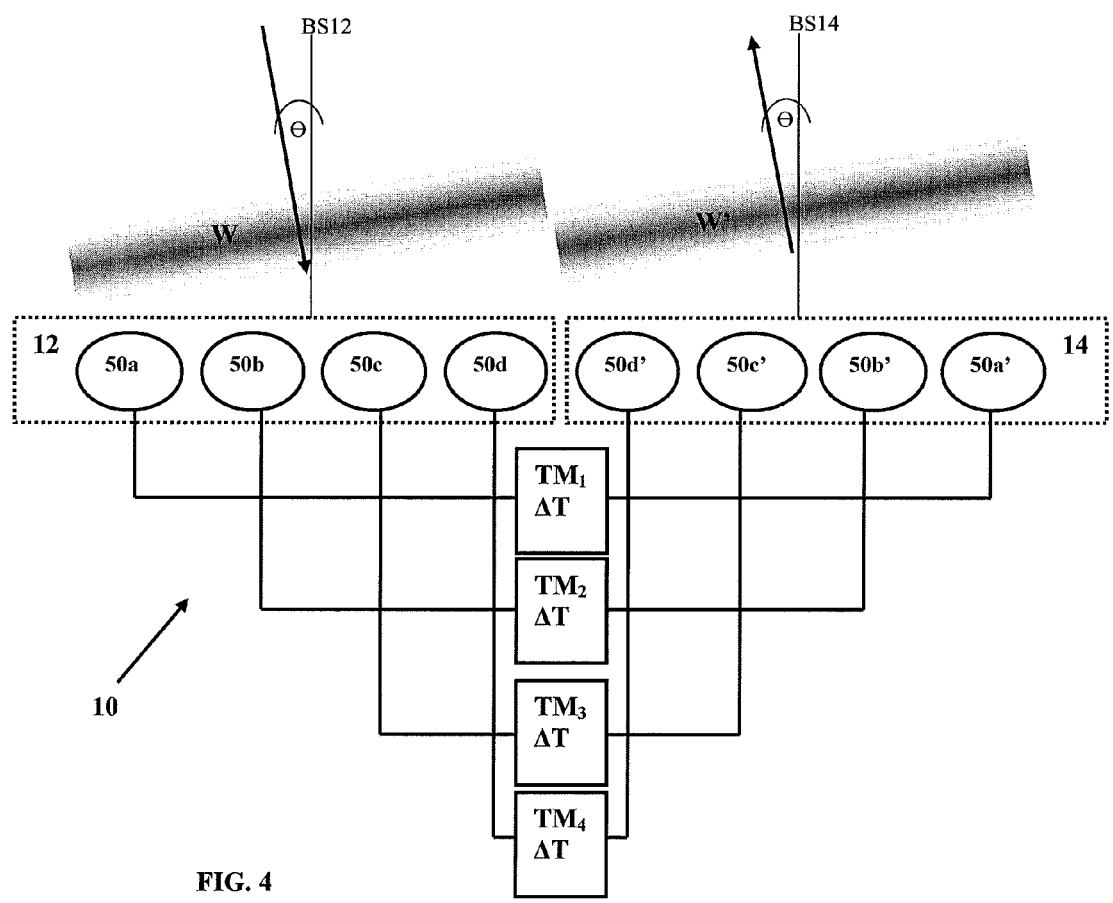
FIG. 4 exemplifies the time delay and the angular shift affected on the transmitted waveform.

FIG. 4 shows an example of a transponder system 10 having similar configuration as that of the example of FIG. 2A. In FIG. 4, the system 10 is configured such that all of the transmission modules TM1-TM4 apply similar time delay $\Delta T$ to the signals being transmitted thereby with respect to the received signal, and forwarding such delayed electric signals to their associated transmitting elements in the corresponding array 14. In this mode, the output waveform W' propagation angle $\theta_t$ with respect to the broadside BS14 of the transmitting array 14 substantially equals the angle arrival $\theta_r$ of the incoming waveform W with respect to the broadside of the BS12 of the receiving array 12. In case arrays 12 and 14 arranged parallel with respect to one another (e.g. being co-linear arrays and/or co-planar two dimensional arrays (2D) which are oriented similarly), the transponder system 10 operates mainly as retro-repeater, i.e. transmitting the collective output waveform back in the same direction as the direction from which the collected waveform arrives. Alternatively, a difference between the angular orientations of the receiving and transmitting arrays 12 and 14 may affect a corresponding angular shift between the received and transmitted waveforms. It should be noted that additionally the transmission modules may apply certain coding to the output waveform (amplitude and/or frequency coding).

Figure 5:
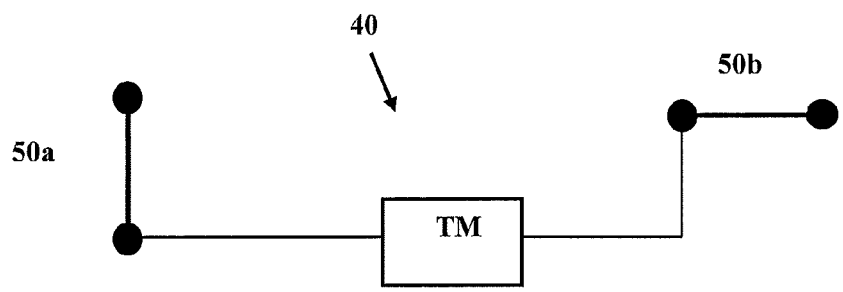
FIG. 5 illustrates a configuration of antenna elements of a receiving-transmitting pair configured to vary polarization of transmitted waveform.

The transponder system 10 of the present invention may operate to affect/modulate various other properties of the received waveform, to thereby generate a desired relation between the properties of the received and transmitted waveforms W and W'. For example, FIG. 5 illustrates a receiving-transmitting pair 40 (a basic block of the transponder system), i.e. formed by an antenna element 50a connected to another antenna element 50b via a transmission module TM, where the configuration of such basic block is aimed at affecting/rotating polarization of the waveform W' being transmitted relative to the input collected waveform W. In this example, each of the antenna elements 50a and 50b is configured as an electric dipole antenna element, and the two elements are oriented along two intersecting axes. As the transmitting antenna element of the pair is oriented differently from the respective receiving antenna element, the transmitting antenna element actually operates as a polarization rotator with respect to signal received thereby. Thus, the different orientations of the antenna elements causes the receiving-transmitting pair to respond to the input collected waveform W of certain polarization orientation by transmission of output waveform W' of a different, possibly orthogonal, polarization orientation. It should however be noted that the antenna elements may be configured as different type of antennas, e.g. both being magnetic/electric dipole antenna, or one being electric dipole antenna and the other being magnetic dipole and/or monopole antenna. Also a polarization difference between the received and transmitted signals may be obtained by utilizing various techniques for changing polarizations for example: utilizing a polarizer operating in the transmission line between the receiving and transmitting antenna elements of a pair of receiving and transmitting antenna; and utilizing different kinds of antennas for receiving and transmitting, e.g., spiral antenna as receiving antenna for receiving circularly polarized radiation and dipole antenna for transmission of linearly polarized radiation.

Figure 6:
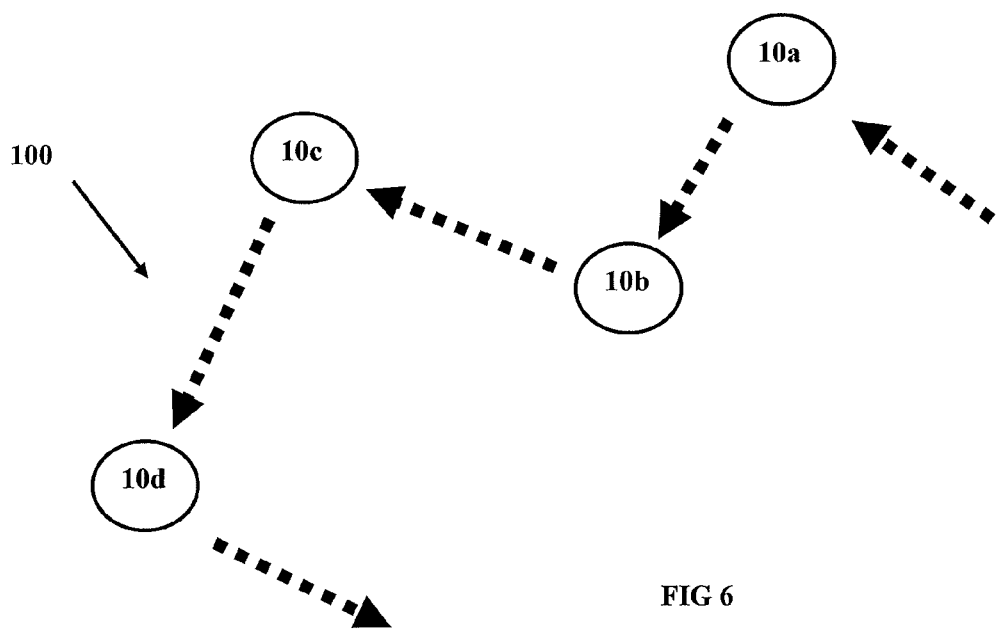
FIG. 6 illustrates a signal transmission network based on plurality of transponder systems.

Reference is made to FIG. 6 illustrating a further example of the invention where a plurality (generally, at least two) of transponder systems of the invention are arranged to form a signal transmission network 100. In the present not limiting example, the network 100 is formed by four transponder systems 10a-10d, where at least one of the transponder systems is configured according to the present invention as described above. The different transponder systems are positioned successively along a predetermined signal path/propagation trajectory and each of them is configured to receive EM signal and transmit a corresponding EM signal with a predetermined angular shift with respect to the received signal. The angular shift applied by each of the transponder systems 10a-10d is selected in accordance with the selected, desired signal path/trajectory and with cornering angles of said trajectory where the transponder systems are located. Thus, transponder system 10A receives input signal W, and redirects a corresponding output signal W' along a segment $S_1$ of the trajectory towards a selected destination where system 10b is located; system 10b generates a corresponding output signal W" to propagate along a successive trajectory segment $S_2$, and so on. Each of the transponder system 10a-10d of the signal transmission network receives and transmits signals from its preceding transponder system (located upstream thereof with respect to the entire signal oath/trajectory) to a successive system (located downstream thereof). Additionally, signals may be transmitted into the signal transmission network from other signal sources and be transited by the network to other signal destinations as the case may be.

The invention claimed is:

1. A transponder system comprising a plurality of antenna elements, said antenna elements comprising first and second arrays of receiving and transmitting antenna elements, each including antenna elements arranged in a spaced apart relationship with a predetermined spacing, wherein:

the antenna elements of the first array are connected to dedicated antenna elements of the second array in accordance with positions of the antenna elements within the arrays, thereby forming receiving and transmitting pairs of antenna elements, operable together to receive an input signal and transmit a collective output signal indicative thereof;

the antenna elements of said receiving and transmitting pairs are connected to one another via respective transmission modules, wherein each of the transmission modules comprises: a sampler adapted for digitizing signals received by the receiving antenna element of the corresponding pair, a memory connectable to said sampler and capable of storing digital representation of the received signals, and a signal generation module connectable to said memory and capable of generating from said digital representation a signal to be transmitted by the transmitting antenna element of the corresponding pair; wherein said generating comprises introducing a predetermined temporal delay to the signal to be transmitted with respect to the received signal, to thereby provide a predetermined angular shift between a waveform of the input signal received by said receiving and transmitting pairs and a waveform of the collective output signal that is collectively transmitted by the receiving and transmitting pairs of the transponder system; and wherein at least some of the antenna elements of said pairs are configured for both receiving and transmitting electromagnetic (EM) signals; said at least some of the antenna elements are connected via at least one additional transmission module to form at least one additional pair of receiving and transmitting antenna elements.

2. The transponder system according to claim 1 wherein the antenna elements of said first and second arrays are connected in pairs in accordance with said positions such that said collective output signal propagates in substantially same direction as a direction of the received input signal.

3. The transponder system according to claim 1 wherein the antenna elements of said first and second arrays are connected in pairs in accordance with said positions such that said collective output signal propagates in a direction different from a direction of the received input signal.

4. The transponder system according to claim 1, wherein the first and second arrays of antenna elements are located in regions spatially separated from one another.

5. The transponder system according to claim 1 wherein the antenna elements of said first and second arrays are arranged in an interlaced fashion.

6. The transponder system according to claim 1, wherein said first and second arrays of the antenna elements have substantially similar geometry each forming a linear array, a closed loop array or a curved array.

7. The transponder system according to claim 1, wherein each of the transmission modules associated with the respective receiving and transmitting pair comprises a Digital-Radio-Frequency-Memory (DRFM) module.

8. The transponder system according to claim 1, wherein the transmission modules of said receiving and transmitting pairs are configured to generate substantially equal time delays between the respective received and transmitted signals.

9. The transponder system according to claim 1, wherein each of the transmission modules further includes a signal processing module adapted for applying predetermined modulation to data indicative of the received signal.

10. The transponder system according to claim 1, wherein the receiving and transmitting antenna elements of each pair are differently oriented with respect to radiation propagation, thereby affecting polarization of the signal such that the transmitted signal has different polarization relative to a polarization of the signal being received by the receiving antenna element of said pair.

11. The transponder system according to claim 1, wherein at least one of the transmission modules is configured as a two-part unit interconnected between the antenna elements of the pair, each being configured for both receiving and transmitting EM signals, thereby providing bi-directional signal transmission with the pair of the antenna elements.

12. The transponder system according claim 1, wherein the antenna elements of said first and second arrays are arranged along two intersecting axes respectively, thereby inducing an additional angular shift between the input and collective output waveforms.

13. A signal transmission network comprising two or more transponder systems configured according to claim 1, said two or more transponder systems being arranged at certain locations along a predetermined signal propagation trajectory such that two successive transponder system are spaced from one another by a segment of said signal propagation trajectory, the angular shift provided by each of said transponder systems being selected in accordance with an angle between a preceding segment from which the input waveform is received at the transponder system and a successive segment.

14. The transponder system according to claim 1 wherein said respective transmission modules of the receiving and transmitting pairs are configured and operable for introducing predetermined temporal delays between the signals to be transmitted by each of said pairs and the signals received by said pairs respectively to affect phase differences between the signals transmitted by the transmitting antenna elements of said pairs providing predetermined angular shift between a waveform of said input signal and a waveform of said collective output signal.

15. A transponder system comprising a plurality of antenna elements, said antenna elements comprising first and second arrays of receiving and transmitting antenna elements, each including antenna elements arranged in a spaced apart relationship with a predetermined spacing, wherein:
the antenna elements of the first array are connected to dedicated antenna elements of the second array in accordance with positions of the antenna elements within the arrays, thereby forming receiving and transmitting pairs of antenna elements, operable together to receive an input signal and transmit a collective output signal indicative thereof;
the antenna elements of said receiving and transmitting pairs are connected to one another via respective transmission modules, wherein each of the transmission modules comprises: a sampler adapted for digitizing signals received by the receiving antenna element of the corresponding pair, a memory connectable to said sampler and capable of storing digital representation of the received signals, and a signal generation module connectable to said memory and capable of generating from said digital representation a signal to be transmitted by the transmitting antenna element of the corresponding pair; and
wherein said respective transmission modules of the receiving and transmitting pairs are configured and operable for introducing predetermined temporal delays between the signals received by each of said pairs and the signals to be respectively transmitted by said pairs to affect phase differences between the signals transmitted by the transmitting antenna elements of said pairs, such that said phase differences provide predetermined angular shift between a waveform of said input signal and a waveform of said collective output signal.

16. The transponder system according to claim 15 wherein wherein the receiving and transmitting antenna elements of each pair are differently oriented with respect to radiation propagation, thereby affecting polarization of the signal such that the transmitted signal has different polarization relative to a polarization of the signal being received by the receiving antenna element of said pair.

17. The transponder system according to claim 15, wherein each of the transmission modules further includes a signal processing module adapted for applying predetermined modulation to data indicative of the received signal.

18. The transponder system according to claim 15, wherein at least one of the transmission modules is configured as a two-part unit interconnected between the antenna elements of the pair, each being configured for both receiving and transmitting electromagnetic (EM) signals, thereby providing bi-directional signal transmission with the pair of the antenna elements.

19. The transponder system according to claim 15, wherein the antenna elements of said first and second arrays are arranged along two intersecting axes respectively, thereby inducing an additional angular shift between the input and collective output waveforms.

* * * * *

UNITED STATES PATENT AND TRADEMARK OFFICE
CERTIFICATE OF CORRECTION

PATENT NO. : 9,134,412 B2
APPLICATION NO. : 14/417185
DATED : September 15, 2015
INVENTOR(S) : Moshe Fireaizen Page 1 of 1

It is certified that error appears in the above-identified patent and that said Letters Patent is hereby corrected as shown below:

In the Claims

In claim 13, column 17, line 59, please change "system" to --systems--.

Signed and Sealed this
Nineteenth Day of January, 2016

Michelle K. Lee
*Director of the United States Patent and Trademark Office*